United States Patent [19]

Turner et al.

[11] Patent Number: 4,507,982
[45] Date of Patent: Apr. 2, 1985

[54] STEERING COLUMN ASSEMBLY

[75] Inventors: Robert Turner, Rayleigh; Robert A. Seabrook, Billericay, both of England

[73] Assignee: Ford Motor Company, Dearborn, Mich.

[21] Appl. No.: 348,115

[22] Filed: Feb. 11, 1982

[30] Foreign Application Priority Data

Feb. 13, 1981 [GB] United Kingdom ................ 8104541

[51] Int. Cl.³ .......................... B62D 1/18; G05G 5/16
[52] U.S. Cl. ........................................ 74/493; 74/531; 280/775
[58] Field of Search ................... 74/493, 531; 280/775

[56] References Cited

U.S. PATENT DOCUMENTS 4,046,024 9/1977 Brouscksou .................... 280/775 X

FOREIGN PATENT DOCUMENTS 902586 1/1954 Fed. Rep. of Germany ........ 74/493
2360454 8/1976 France ................................. 74/531
EP19571 11/1980 France ................................. 74/493

Primary Examiner—Allan D. Herrmann
Attorney, Agent, or Firm—Peter D. McDermott; Roger L. May

[57] ABSTRACT

A steering column assembly comprises a column part (1) rotatable in a support (7) attached to a bracket (8) which can be secured to a fixed member, a sliding connection e.g. formed by a slot (16) and pin (20) permitting movement along an axis (A) and about a pivot axis (B) perpendicular thereto to permit height and rake adjustment, and a guide e.g. formed by the peripheral edge of an aperture (17) in the slot which is engaged by a follower (31) fixed to the support (7) which defines the limits of the range of relative movement of the column part (1) thereby reducing the risk of interference with adjacent components. The follower (31) forms part of a locking mechanism (21,22,38,43) for fixing the bracket and the support in a desired relative configuration.

7 Claims, 3 Drawing Figures

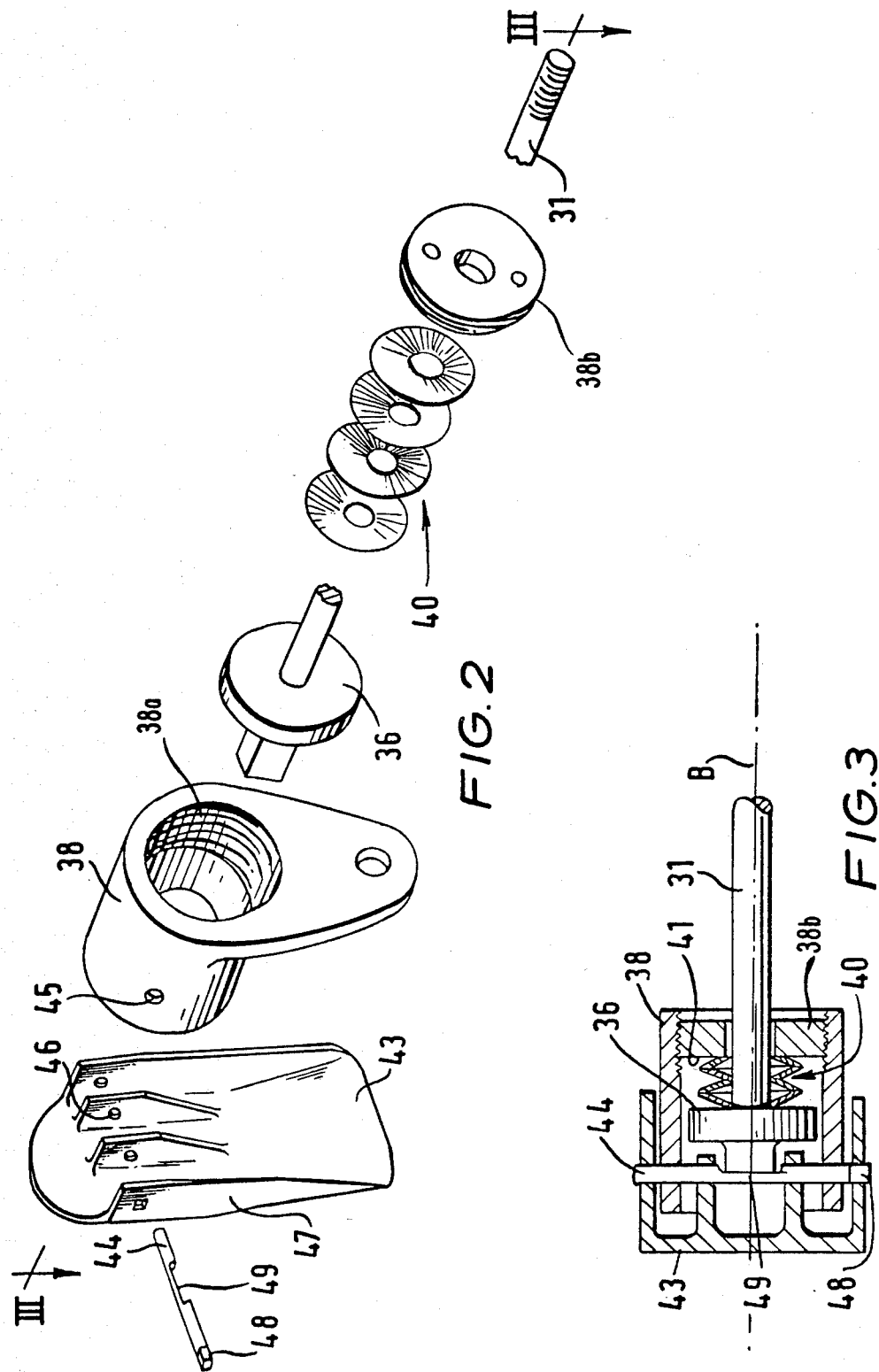

4,507,982

STEERING COLUMN ASSEMBLY

DESCRIPTION

This invention relates to steering column assemblies.

Conventional adjustable steering column assemblies comprise a column part, a support rotatably carrying the column part, a bracket carrying the support and adapted to be secured to a fixed member, means securing the support to the bracket to permit relative movement thereof in an axial direction and about an axis perpendicular thereto, and a lock for fixing the bracket and the support in a desired relative configuration. This construction allows the driver to adjust the height and/or rake of the assembly to his own needs.

Such assemblies suffer from the disadvantage that the driver can unwittingly adjust the column into a position which is uncomfortably or dangerously close to other components in the driving compartment, in which case further adjustment of assembly becomes necessary as the journey progresses.

According to the present invention, there is provided a steering column assembly comprising a column part, a support rotatably carrying the column part, a bracket carrying the support and adapted to be secured to a fixed member, means securing the support to the bracket to permit relative movement thereof and a lock for fixing the bracket and the support in a desired relative configuration, characterised in that the means securing the support to the bracket comprises a sliding connection which permits relative movement thereof along an axis and about a pivot axis perpendicular thereto, and a guide defining the limits of the range of relative movement of the bracket and the support.

By providing a guide which defines the limits of the range of relative movement of the bracket and the support, the risk of the driver moving the assembly into a position in which it interfers with adjacent objects can be eliminated by suitably shaping the guide.

The sliding connection is conveniently formed by a slot parallel to the said axis and formed, for example, on the bracket, and a pin, for example carried by the support, received in the slot for sliding and pivotal movement therein.

The guide is conveniently formed by a guide surface, for example defined by an aperture in the bracket, extending in a plane perpendicular to the pivot axis, and a follower, preferably fixed to the support. A compact construction can be achieved by forming one element of the lock as part of the guide, for example as the follower.

Any suitable locking means may be used; a frictional lock is however preferred because this allows an infinite number of adjusted positions within the limits set by the guide. Preferably therefore the lock comprises a plurality of a friction surfaces movable over each other when the support is moved relative to the bracket, and a locking element movable into and out of a locking position to vary the frictional force between the friction surfaces.

In the preferred embodiment of the invention one friction surface is provided by a first friction plate fixed relative to either one of the support or the bracket, and another friction surface is provided by a second friction plate pivotably connected to the first friction plate and to the other of the support or the bracket, one of the pivotable connections of the second friction plates allowing relative radial sliding movement of the plates.

In order to reduce the risk of the support becoming unlocked from the bracket, the lock preferably includes a locking element movable into and out of a locking position, and means for biasing the locking element into the locking position. One or more disc springs are preferably used to bias the locking element in view of the high forces required, and the short range of movement of the locking element. In the preferred embodiment of the invention, the locking element is movable with the support (or, alternatively, the bracket) and acts also as a follower which engages a guide surface on the bracket (or, in the alternative construction, on the support) to form the guide.

A preferred embodiment of the invention will now be described, by way of example only, with reference to the drawings in which:

FIG. 2 is a similar view, on an enlarged scale, of part of the assembly of FIG. 1; and FIG. 3 is a cross-section taken along the line III—III of FIG. 2.

Figure 1:
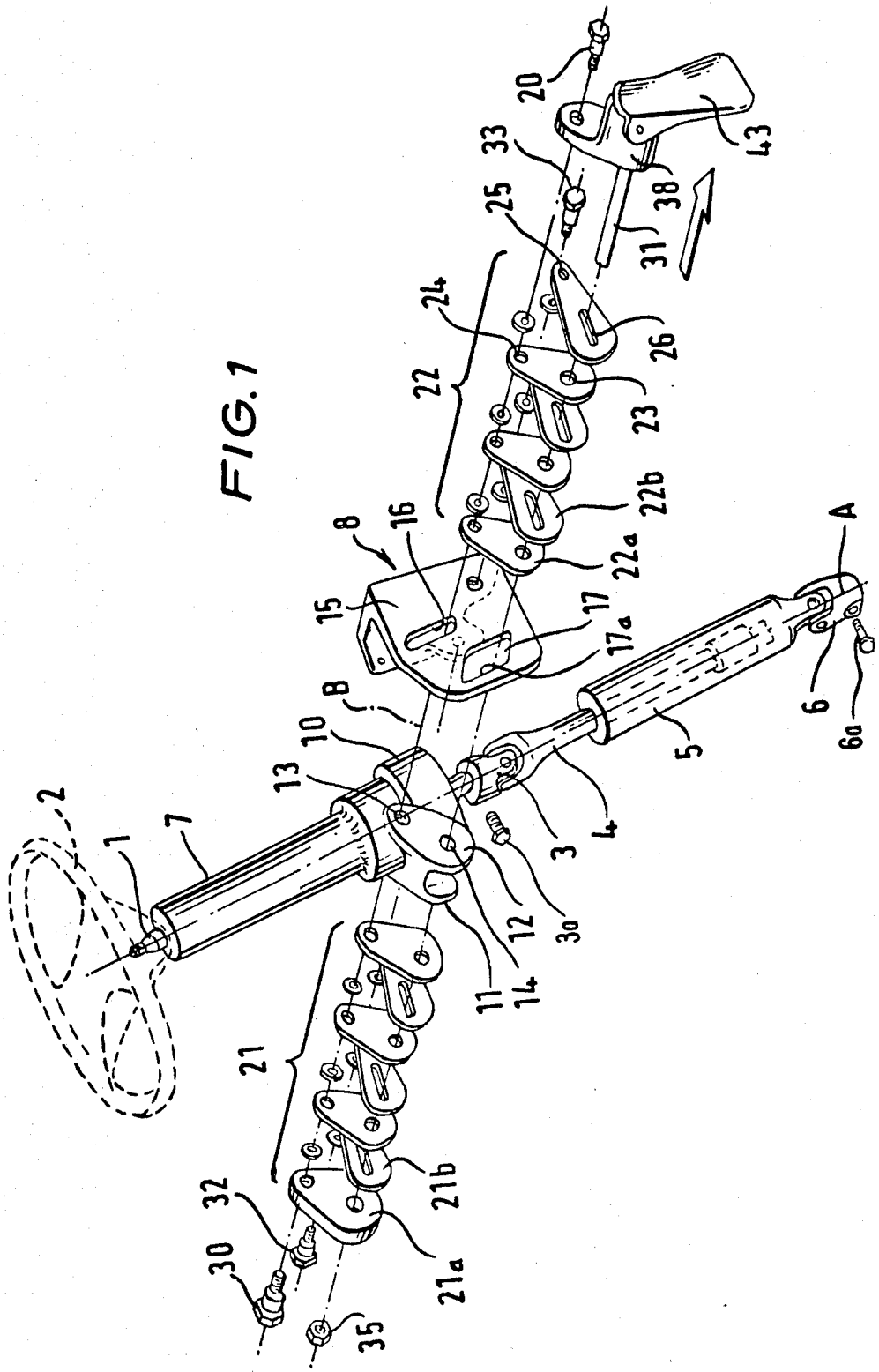
FIG. 1 is an exploded perspective view of a steering column assembly in accordance with the invention.

Referring to the drawings, the steering column assembly comprises a first column part 1 carrying a steering wheel 2 at its upper end and attached at its lower end by a first universal joint 3 to the upper end of a second column part 4. Set screw 3a fixes the lower end of column part 1 to universal joint 3. The second column part 4 is telescopically received within a third column part 5, the lower end of which carries a second universal joint 6 by means of which the assembly can be attached to a steering box (not shown). Set screw 6a fixes a suitable column or rod from the steering box to universal joint 6. This construction allows the first column part 1 to be both raised in the direction of the axis A of the assembly and tilted relative to the second column part 4, about an axis B extending at right angles thereto.

The first column part 1 is rotatably mounted in a tubular support 7 which is in turn carried by a bracket 8 by means of which the assembly is secured to a fixed member in a vehicle driving compartment. The lower end of the support 7 carries a collar 10 which is provided with two flat friction faces 11, 12 extending in a plane at right angles to the transverse axis B. The faces 11 and 12 are each provided with a threaded bore 13 extending along the axis B, and a plane bore 14 extending parallel to the axis B but radially spaced therefrom.

The bracket 8 includes a flange 15 extending in a plane parallel to the faces 11 and 12 on the collar 10. A slot 16 in the flange 15 extends in a direction parallel to the axis A, and an aperture 17 defining a parallelogram-shaped guide surface 17a in the flange 15 is radially off set from the slot 16. The support 7 is connected to the bracket 8 by means of a headed pivot pin 20 which passes through the slot 16 and into the threaded bore 13 in the friction face 11, the pin 20 being slidable and pivotable in the slot, thereby permitting the support 7 to move relative to the bracket 8 along axis A, and to pivot about the axis B.

In order to fix the bracket 8 and the support 7 in a desired angular orientation, the assembly includes a lock mechanism which comprises two sets of friction plates 21, 22, one on each side of the collar 10, overlying the friction surfaces 12 and 11 respectively. These plates are arranged at right angles to the axis B and, together with the friction surfaces 11 and 12 of the collar 10 and the face of the flange 15 on the bracket 8 against which it lies, move over each other when the support 7 is moved relative to the bracket 8. Each set of friction plates comprises three pairs of similar plates 21a, 21b, 22a, 22b. In each pair of plates, each plate 21a, 22a is provided with two bores 23, 24 having a spacing equal to that between the threaded bore 13 and the plane bore 14 in the friction faces 11 and 12, and the other plates 21b 22b are provided with a corresponding bore 25 and slot 26. The plates 21a, 22a are respectively fixed to the support 7 through one of the bores 24 therein by means of the pivot pin 20 and a corresponding pivot pin 30 which is received in the threaded bore 13 in the friction face 12 and through the other of the bores 23 therein by a link such as locking bar 31 which extends parallel to the axis B through the aperture 17 in the bracket 8 and the plane bores 14 in the friction faces 11 and 12. The plates 21b, 22b are pivotably connected to the bracket 8 by headed pivot bolts 32, 33 which are received in threaded bores in the bracket 8. They are also pivotably connected to the support 7 by means of the locking bar 31, which also passes through the slots 26 therein, the slots allowing sliding movement of the friction plates 21b, 22b relative to the plates 21a, 22a.

One end of the locking bar 31 is threaded and carries a retaining nut 35 which abuts the outer end plate 21a of the set 21 of friction plates. As best seen in FIGS. 2 and 3, the other end of the locking bar 31 is shaped to define a radial abutment 36 adjacent the end. This end portion of the locking bar 31 is housed within a mounting 38 secured to the bracket 8 by the pivot pin 20. Mounting 38 comprises threaded aperture 38a which receives correspondingly threaded closure plate 38b. The face of the mounting nearer to the bracket 8 extends at right angles to the axis B and offers a further friction surface for cooperation with the surface of the adjacent friction plate 22b.

A set of disc springs 40 is positioned between the abutment 36 on the locking bar 31 and a radial face 41 of the mounting 38 and bias the locking bar 31 to the left as seen in FIG. 3. In this position, the force exerted by the disc springs 40 compresses the two sets 21, 22 of friction plates thereby generating a frictional force between the surfaces thereof and between the abutting surfaces of the mounting 38, the flange 15 of the bracket 8 and the two friction surfaces 11, 12 on the collar 10 of the support 7, the total frictional force being sufficient to prevent a driver from moving the support 7 relative to the bracket 8.

In order to permit movement of the support 7 and thereby to allow the driver to adjust the steering column part 1, the locking bar 31 may be moved to the left as seen in FIG. 1 by means of an operating lever 43. The lever 43 is connected to the mounting 38 for movement about a horizontal axis by means of a pin 44 which passes through two apertures 45 in the mounting 38 and is secured as a press fit in four apertures 46 formed in flanges 47 on the lever 43. One end 48 of the pin is of square cross-section and engages with a square aperture in one of the flanges 47 so that the pin 44 cannot rotate relative to the lever 43. A central section 49 of the pin 44 is of reduced cross-sectional size and is eccentric with respect to the axis of the pin. This central section 49 abuts the end of the locking bar 31 and is so disposed that, as the lever is raised from the vertical position illustrated in FIG. 2, the central section displaces the locking bar 31 to the right. This compresses the disc springs 31 and reduces the frictional force between the friction plates sets 21, 22, the mounting 38 and the bracket 8 and support 7. The driver may then adjust the upper column part about the axis B and along the axis A. This movement will be accompanied by a scissor-like sliding movement of the friction plates 21, 22. By suitably shaping the surface of the central section 49 of the pin 44, the reaction force exerted on the pin by the locking bar 31 can be used to retain the lever in the horizontal position, leaving both the driver's hands free to adjust the upper column part 1.

The range of relative movement of the support 7 and the bracket 8 is however limited since the locking bar, which is fixed in the plane bores 14 in the collar 10 of the support 7 can only move within the limits of the guide surface 17a formed by the inner edge of the aperture 17 in the bracket. As a result the driver can only adjust the upper part 1 of the steering column within the limits defined by the aperture 17, and therefore does not run the risk of positioning the steering wheel too close to adjacent objects in the drivers compartment of the vehicle. When the driver has moved the steering column into a suitable position, he releases the operating lever 43, and the locking bar 31 is moved by the Belleville washers 40 to effect automatic engagment of the friction surfaces in the assembly 10 that the column is locked in place. Since the locking bar 31 is biased into its locking position, the chances of accidental release of the steering column for adjustment are reduced. Moreover the locking force applied by the locking bar 31 is determined by the disc springs 40 and is independent of forces applied to the lock by the driver.

We claim:

1. A steering column assembly comprising a column part, a support rotatably carrying the column part, a bracket carrying the support and adapted to be secured to a fixed member, means securing the support to the bracket to permit relative movement thereof and a lock for fixing the bracket and the support in a desired relative configuration, characterized in that the means securing the support to the bracket comprises a sliding connection which permits relative movement thereof along an axis and about a pivot axis perpendicular thereto, and a guide defining the limits of the range of relative movement of the bracket and the support, wherein the lock comprises (i) a plurality of friction surfaces movable over each other when the support is moved relative to the bracket, (ii) a locking element movable into and out of a locking position to vary the frictional force between the friction surfaces, comprising a link movable relative to a mounting fixed to the bracket and an operating lever pivotably mounted on the mounting and contacting the link, and (iii) means for biasing the locking element into the locking position comprising a spring acting between the link and the mounting, and wherein one friction surface is provided by a first friction plate fixed relative to either one of the support or the bracket, and another friction surface is provided by a second friction plate pivotably connected to the first friction plate and to the other of the support or the bracket, the pivotable connection of the second friction plate allowing relative radial sliding movement of the friction plates.

2. An assembly according to claim 1 wherein the sliding connection comprises a first slot extending parallel to said axis and a pin received in the slot for sliding and pivotal movement therein.

3. An assembly according to claim 2 wherein the bracket defines the slot and the pin is mounted on the support.

4. An assembly according to any one of claims 1 to 3 wherein the guide comprises a guide surface extending in a plane perpendicular to the pivot axis and a follower engagable therewith.

5. An assembly according to claim 4 wherein the guide surface comprises an aperture in the bracket and the follower is fixed to the support.

6. An assembly according to claim 1 wherein the lock includes an element forming part of the guide.

7. An assembly according to claim 1 wherein the means for biasing the locking element comprises one or more disc springs.

* * * * *